Oct. 7, 1969        R. S. HAWKE                3,471,238
           INTERFEROMETRIC METHOD AND APPARATUS
                    Filed Nov. 2, 1966
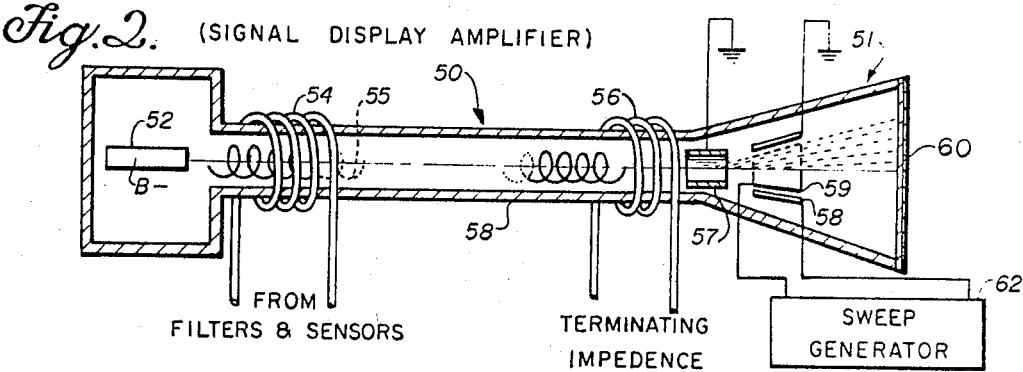
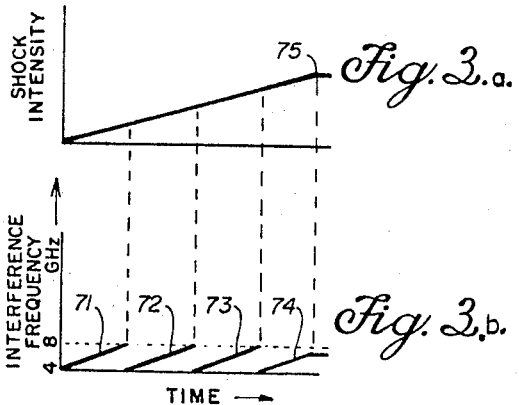
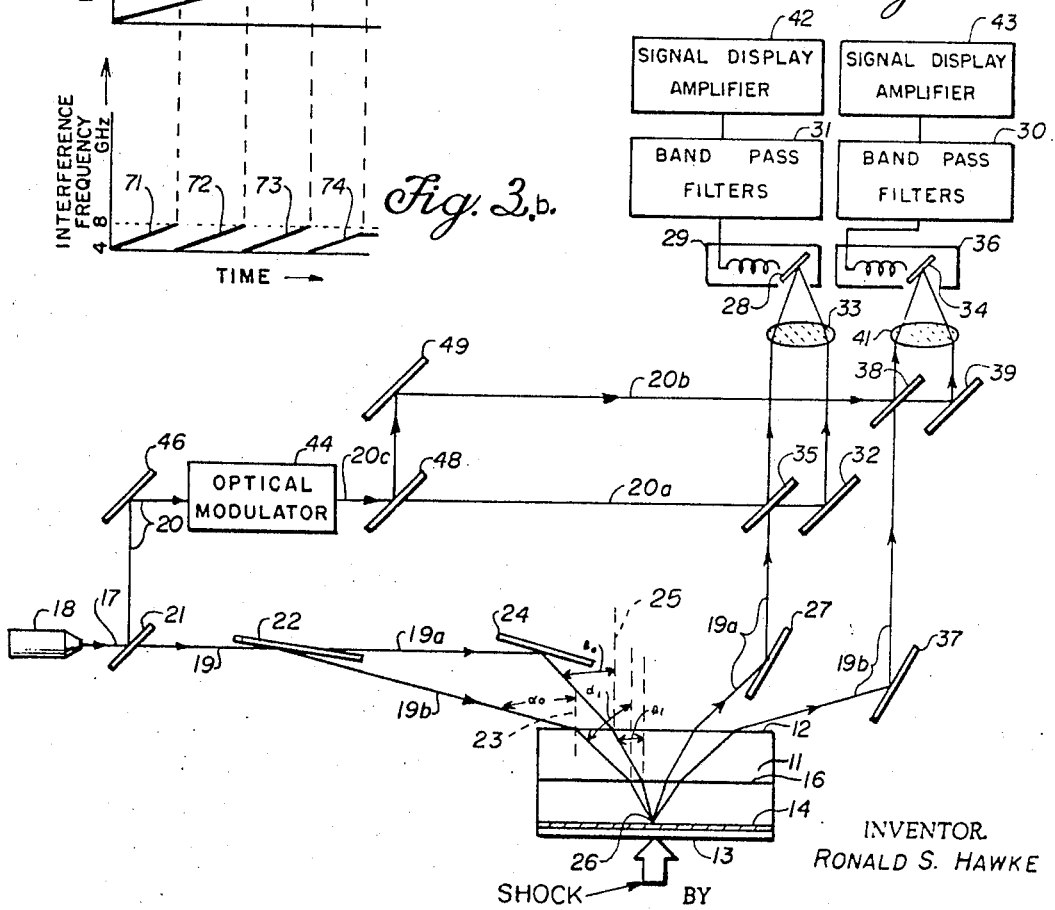
INVENTOR.
RONALD S. HAWKE

United States Patent Office 3,471,238
Patented Oct. 7, 1969

3,471,238
INTERFEROMETRIC METHOD AND APPARATUS
Ronald S. Hawke, Livermore, Calif., assignor to the United States of America as represented by the United States Atomic Energy Commission
Filed Nov. 2, 1966, Ser. No. 591,655
Int. Cl. G01b 9/02
U.S. Cl. 356—107            12 Claims

ABSTRACT OF THE DISCLOSURE

An interferometric method for measuring the velocity of a shocked reflective surface. A single frequency laser beam is split into at least two each divergent reference and diagnostic beams with the reference beams being directed into a frequency recording apparatus. The diagnostic beams are reflected from the shocked reflective surface and directed into the frequency recording apparatus to recombine in interfering relationship with the reference beams to yield information regarding the velocity of the shocked surface.

---

The invention described herein was made in the course of, or under, Contract W-7405-ENG-48 with the United States Atomic Energy Commission.

This invention, in general, relates to interferometry, and more particularly to an interferometric system utilizing an electro-optical method and apparatus for producing electrical output signals and graphical displays of time rates of change of the number of optical interference fringes extending in frequency to above the gigahertz range. (A hertz is a cycle per second.)

Interferometry relates to the phenomenon that occurs when two single frequency light beams travel over optical paths of different effective lengths to converge in a common location to produce an interference pattern. If one of said paths is varied in length with respect to the other, the central zero order interference fringe will alternately become light, then dark, as the convergent light waves combine additively and subtractively. The frequency at which such alternation occurs will hereafter be referred to as the interference frequency, which frequency is a measure of the rate of change at which the path length is effectively varied.

Interferometry has previously been used extensively for the accurate measurement of distances or slow displacements. The measurement obtained consists in essence of a count number, i.e., the number of times which a specific light or dark interference pattern is repetitively produced, with each unit of count being a displacement distance corresponding to a wavelength of the interfering light. While interferometry is an extremely accurate method for measuring distances, the applicability of the method has been heretofore severely limited because it has not been possible to measure interference frequency counts over a broad range extending to very high interference frequencies, i.e., above a few hundred megahertz arising as in the measurement of high velocity displacements.

For example, in high explosive work, it is desirable to obtain information concerning the acceleration, velocity and dielectric properties including index of refraction of shocked materials. With a counting method being made available to obtain counts of the interference patterns produced by diagnostic interferometric light beams reflected from the surfaces of structures exposed to the effects of a shock front or other high velocity impact, it would be possible to derive data which can be utilized for calculating the velocity of compression and changing index of refraction of the material of such structure. The expected compressive velocity of a shocked material is of the order of centimeters per microsecond yielding interference frequencies far above the range of conventional data analyzing equipment.

In conventional interferometry practice, the interference pattern images are projected onto an electrical sensor which detects the alternating cycles of zero order fringes. The frequency response of such sensors is inherently limited so that the bandpass capabilities of even the best sensors is inadequate for detecting and counting the very high and widely varying interference frequencies involved in high velocity or rapidly changing phenomena measurements.

I have now devised a method and associated apparatus by which it is possible to accurately gauge interference frequencies which transcend the bandpass limitations of presently available electrical sensors. In accordance with this method, the reference light beam which is used to create the reference pattern is modulated at microwave frequencies, e.g., by means of a resonant cavity driving an electro-optic crystal. The carrier or reference beam and each side band, i.e., the upper and lower frequency sidebands, from the modulated light beam are interacted in heterodyne relation with diagnostic light beams which are directed at the specimen under examination to derive a beam of light carrying the desired information. More particularly, the resultant beam is of a lesser bandwidth than the specimen directed beam, but includes information derived from interference frequencies above and below the derived bandwidth which is then in a form accommodated within the bandpass capabilities of conventional electrical sensors. The output of the electrical sensors representative of the interference frequency may then be amplified and is preferably displayed by a uniquely constructed display and amplifier tube which is a further feature of the present invention. In this tube, an electron beam is velocity-modulated therein to carry the information, and then is accelerated from an electron gun through a helix structure past a set of deflection plates directly onto a cathode ray tube screen, thereby allowing the electron beam signal to be swept over the cathode ray tube face for direct display of the resultant interference frequencies for analysis. These displayed frequencies may then be used to obtain information on rapidly varying phenomena, for example, displacement velocity on explosively shocked specimen plates, compressive effects and changes induced in other specimen properties to provide information from which such properties can be determined.

Accordingly, it is an object of the invention to provide improved interferometric methods and apparatus.

Another object of the present invention is to provide apparatus for determining the interference frequency of a very rapidly changing optical path in an interferometric system.

Still another object of the invention is to provide apparatus for amplifying and displaying a wideband interference frequency derived in interferometric measurements.

Another object is to provide a method for transmitting information derived in a wideband interferometric optical signal through a narrower bandwidth detection, amplification and display device.

Other objects and features of the invention will be seen in the following description taken together with the accompanying drawings, of which:

FIGURE 1 is an illustration of an arrangement including a plan view of a specimen plate subjected to an explosively generated shock, together with apparatus of the present invention employed to evaluate phenomena originating in said plate;

FIGURE 2 is a cutaway view of a combined travelling wave and cathode ray display tube employed for displaying information derived in the arrangement of FIGURE 1;

FIGURE 3a is a time plot of a shock wave amplitude profile applied to such a specimen plate; and FIGURE 3b is the corresponding interference frequency appearing from data available from the signal display apparatus.

The apparatus and procedure of the invention may be employed for studying interferometric interference patterns in which the frequencies of variation extend from substantially zero to the very highest which are far above or outside the characteristic operating frequency bandwidth or bandpass of electro-optical sensors and electronic amplifiers. The interference patterns may be created utilizing light beams at least one of which traverses a path which effectively varies in length, refractive index or the like so as to cause phase shifts relative to that of a reference beam to produce interference patterns.

The invention will be described with reference to a particular use in shock wave diagnostics. It is emphasized, however, that while the present invention is most effective as a shock diagnostics tool and may be described by reference to this particular use, the application of the present method is not limited to the particular use set forth below, but may be employed universally for the determination of the frequency of rapidly changing or wide range interference patterns derived from any source.

Referring now to FIGURE 1, a transparent specimen plate 11, e.g., polymethylmethacrylate plastic, approximately one centimeter thick is disposed with a surface 13 facing a charge of high explosive (not shown) adapted for detonation to produce a planar shock wave (not shown) to collide with said vertical free standing surface 13 of specimen 11. A planar explosive or explosive lens combination yielding a planar detonation wave may suffice. The surface 13 is made reflective, e.g., with an adherent or vapor-deposited reflective foil 14 having a highly polished side facing the opposite surface 12 of said plate 11 so that during the course of an experiment, the motion of foil 14 corresponds to the motion of surface 13. The material of the transparent plate 11 is normally characterized by an index of refraction $n_1$. However, under shock wave impact or other rapid displacement, any portion of plate 11 which is experiencing compression has a higher index of refraction $n_2$ in the compressed region. A light refractive boundary 16 then in effect exists between the regions $n_1$ and $n_2$ corresponding to a dividing plane between compressed and normal material regions of plate 11, which lie ahead of the shocked zone.

Plate 11 may be positioned with one edge merely resting freely on a smooth supporting surface so that the shock wave from the high explosive charge collides uniformly with surface 13 covered with foil 14 to generate a planar shock front 16 within the thickness dimension of plate 11. The inertia of the plate 11 retains the plate in substantially a fixed position for a time period long enough before the plate 11 is displaced and destroyed by the explosive power to allow the measurements to be made by the present invention. The duration of such a measured interval may be approximately 50 nanoseconds. During this time, the shock front 16 in the material will travel across part of the specimen plate, and the reflective foil will move a fraction of a millimeter. One particularly difficult task which may be accomplished in the procedure is to determine the velocity and acceleration of the specimen plate. In order to evaluate these parameters, recourse must be had to interferometrically observing the effects of the moving specimen plate and the reflective foil on a beam of light. The key information needed is the rate of change of an interference pattern, which is produced when this light beam is reflected from the foil surface and recombined with a reference beam. The remaining variables necessary to deduce the velocity of the foil, e.g., the geometry of the diagnostic light beam, index of refraction of the unshocked material, can be obtained by standard methods.

The velocity with which the shock wave moves can be determined by the use of pin switches at two points (see U.S. application Ser. No. 402,663, filed Oct. 8, 1964 by Darwin H. Henley) Patent No. 3,287,518 issued Nov. 22, 1966. By placing two pin switches at points along the path of travel of a shock wave and measuring the elapsed time between the closure of the switches, the shock wave velocity may be calculated. The detailed aspects of the procedure are described in the report UCRL 14488, entitled Particle Velocity Measurement with an Optical Heterodyne System, by Roland S. Hawke.

An optical system and apparatus for generating the above-mentioned interference patterns and measuring the rate of change thereof comprises, in part, a single frequency laser 18 which generates monochromatic light beam 17. A first partially transmissive beam splitter mirror 21 divides beam 17 in accord with conventional practice into a first specimen-directed beam portion 19 and a second reference beam portion 20 which is directed angularly away from the specimen-directed beam portion 19. Mirror 21 is customarily incorporated in the laser device. A second partially transmissive beam-splitter mirror 22 divides beam portion 19 into first and second angularly diverging specimen-directed diagnostic beam components 19a and 19b. Transmitted component 19a is reflected by mirror 24 through the face 12 opposite foil 13 into transparent specimen plate 11, while reflected component 19b enters the specimen directly from mirror 22 through face 12. The exterior angle of incidence made by beam component 19b with a transverse plane perpendicular to plate surface 12 is $\alpha_0$, while the exterior angle of incidence made by beam component 19a with respect to a transverse plane perpendicular to plate surface 12 is $\beta_0$. The interior angles made by beam component 19b and 19a with similar perpendicular planes with plate surface 12 are $\alpha_1$ and $\beta_1$, respectively. In the context of the specific experiment described the magnitude of these angles is precisely determined since these quantities are necessary to determine the foil velocity and index of refraction of the specimen. Eventually beams 19a and 19b converge in plate 11 and are reflected from the polished surface of foil 13 as angularly diverging beams to emerge from surface 12 at a location displaced from the points of entry. Upon outward reflection from specimen 11, e.g., after shock impact whence path lengths of the beams are varied by displacement, change in refractive index, etc., beam components 19a and 19b are directed by mirrors 27 and 37 respectively in parallel paths toward signal display amplifiers 42 and 43, each having a phototube 29 and 36 respectively as input sensor devices. Note that two beam components 19a and 19b are utilized because in this example the optical path is geometrically dependent on the angles of beam incidence and reflection and because of transition in refractive index across the shock front from the specimen plate 11. Two beam components will allow mathematical elimination of the geometrical dependence. In general, a single diagnostic beam alone is sufficient for velocity determinations in accord with conventional interferometry practice, provided that the reflection takes place directly from the moving surface without traversing an area of changing refractive index or other factor affecting effective path length is not present.

Returning to beam reference portion 20, mirror 46 deflects beam portion 20 into an optical modulator 44. Modulator 44 is of the resonant cavity electro-optic type, and is described in the article, Transmitters and Receivers for Optical Communications, by James R. McDermott in Space Aeronautics, June 1963. The purpose of the modulator is to impress upon the reference signal sideband frequencies $f_1$ and higher order multiples of $f_1$ equal to $2f_1$, $3f_1$, etc. Where there is any chance of modulation ambiguity from the dual nature of the sidebands, upper and lower, single sideband modulation may be used. A suitable modulation technique for accomplishing this is discussed in the Proceedings of the IEEE, August 1962, Single Sideband Suppressed Carrier Modulation of Coherent Light Beams, by C. F. Buhrer.

Upon exit from modulator 44, modulated beam reference signal 20c is split into two secondary reference signals 20a and 20b by the partially transmissive beam splitter mirror 48. Mirror 49 then directs beam 20b in a path parallel to beam 20a. It is desirable to combine beams 19a with 20a and beams 19b with 20b prior to arrival at common focal points 28 and 34 so that the beams will be coaxial and thereby conserve energy. To accomplish this purpose, beam splitting mirrors 35 and 32 which are partially transmissive are placed in angular relation in the intersecting path of beams 19a, 20a so that divided-combined parallel beams are directed through lens 33 to focus the resultant combined coaxial beam components onto focal point 28. A similar combination of beam components 19b and 20b is accomplished with beam splitter mirror 38, mirror 39, with lens 41 focusing the combined coaxial beams on focal point 34.

The focal points 28 and 34 for the zero order interference fringes are located at photo-cathodes of conventional travelling wave phototubes 29 and 36, whereat the additive-subtractive light output produced by the interfering beams is provided. The electrical analogue signals developed by phototubes 29 and 36 in response to the foregoing light output are then derived frequencies obtained by interacting the unmodulated specimen-directed signal with the modulated signal. The derived frequency signal is measured by the signal display amplifiers 42 and 43. Signal display amplifiers 42 and 43 are wideband devices which detect the relatively small but rapid frequency shifts due to the shock impact upon specimen 11, or the like. Bandpass filters 30 and 31 heighten the selectivity of signal display amplifiers 42 and 43 to assure selection of a discrete bandwidth. The design of such bandpass filter is conventional and well known in the art.

The sideband frequencies $f_1$, $2f_1$, etc., in beams 20a and 20b beam combine with specimen-directed beams 19a and 19b, producing frequencies which are the sum and difference of the two. The derived frequencies, called intermediate frequencies and which contain information related to the variation in path length, displacement, etc., are then amplified and displayed by the signal display amplifiers 42 and 43. The input device to signal display amplifiers 42 and 43 is a standard traveling wave phototube 28 or 29 or other wideband photo-electric input sensor. Phototubes 28 and 29 have a characteristic bandwidth sensitivity of 4 to 8 gigahertz. In practice, for the example given, the rate of movement of the surface 13 will yield interference frequencies of about 16 gHz. corresponding to a compressive shock velocity of about one centimeter per microsecond. Thus the sideband frequencies $f_1$, $2f_1$, etc., produced by modulator 44 are selected to be multiples of 4 gHz. with $f_1=4$ gHz. It will be seen that, as the interference frequency increases from zero to 16 gHz., one of the sideband frequencies $f_1$ or a multiple thereof will produce an intermediate frequency which lies in a bandwidth of 4 to 8 gHz. If the interference frequency increases steadily from zero to 16 gHz., at least four different discrete bands of the interference frequency necessarily are displayed sequentially in the intermediate frequency bandpass of 4 to 8 gHz.

FIGURE 3b shows sequential traces 71, 72, 73, 74 of four 4 gHz. bands of an interference frequency as they pass through the pass band of the signal display amplifiers as an intermediate frequency responding to a shock wave profile as indicated in FIGURE 3a. If the interference frequency does not increase steadily, the plots shown in FIGURE 3b will not be straight lines, but will be correspondingly curved.

As the signal frequency begins at 0 Hz. and increases to 4 gHz., the necessary beat frequency will be the +4 gHz. sideband. Varying from 4–8 gHz., the signal frequency will appear in the pass band without interference with beat frequencies. Increasing from 8 to 12 gHz., the signal frequency will be beat with a −4 gHz. sideband which is combined with the signal frequency to place the signal in the 4–8 gHz. pass band. Finally, in increasing from 12 gHz. to 16 gHz., the signal frequency will be combined with a −8 gHz. sideband to fit within the 4–8 gHz. pass band. This second harmonic sideband of 8 gHz. which is double that of the lowest frequency sideband will have less power than the lowest. It is therefore desirable that the signal display amplifier have an automatic gain control feature, as well known in the art, to compensate for resultant variation in intensity.

It will be noticed that the modulating frequency is made equivalent to the bandpass frequency. This allows the signal frequency to be reduced or increased in frequency increments equal to the width of the pass band. The modulating frequency could be chosen to be less than the band pass frequency with overlapping traces being portrayed, but should not be larger, otherwise undesirable gaps will occur in the range of interference frequencies which are displayed.

The information contained in the intermediate frequencies is the same as that in one segment of the diagnostic signal. That is, the diagnostic signal is sectioned into segments, frequency shifted to an intermediate frequency, each segment having the bandwidth of the intermediate frequency bandpass and each segment being observed sequentially as it occurs. Which segment of the motion is under observation is determined from a general knowledge of the motion of the object under surveillance.

For example, in the case where an object starts from rest and accelerates to a terminal velocity, the initial interference frequency will be near zero and successive segments will represent successively higher velocity ranges. For electronic equipment of the UHF type, these low frequencies must be shifted up in the range for observation. When the object reaches a high terminal velocity and the interference frequency is in the gigahertz range, a shift down in range is necessary to provide acceptance by the bandwidth of the device. Each time the bandpass segment is reset by the modulation rate, information characteristic of the precise motion of the object under surveillance is obtained.

Thus the present invention defines a method for passing a wideband optical signal through a narrow band electro-optical and associated electronic devices in much the same manner that such a signal would be displayed in a wideband device if such were available wherever the signal frequency increases continuously from a known value to another value.

Signal display amplifiers 42 and 43 are illustrated in detail in FIGURE 2. The signal display amplifier comprises a first travelling wave section 50 which provides electron beam 53 for the second tube section 51. Tube section 50 contains electron gun 52 arranged to direct a beam 53 axially in glass envelope 58. A waveguide helix 55 circumjacent envelope 58 is provided with microwave input coupling 54 and microwave output coupling 56, respectively, disposed at a first and second end of the helix 55. A hollow cylindrical accelerator anode 57 disposed coaxial with the electron gun 52 at the second end of the helix 55, and is electrically insulated from the helix. Tube section 50 has a bandpass compatible with the electrical sensor, 4 to 8 gHz. and a gain, e.g., of 30 decibels or more. The noise figure is 15 decibels or less. The total voltage standing wave ratio is required to be less than 3 to 1. Cathode current should be about one milliampere productive of an output power of one milliwatt.

The present display amplifier may be thought of as a combination travelling wave and cathode ray display tube, first section 50 being in part similar to portions of a travelling wave tube and second tube section 51 resembling the deflection plate and screen portions of a cathode ray tube. A Kovar seal washer is welded to the joint between the sections to allow smooth and uniform joining to the cathode ray tube section. (Kovar is a glasssealing alloy consisting of 20% nickel, 17% cobalt, 0.2% manganese, and the balance iron.) A standard production travelling wave tube meeting the above specifications is identified as VAC-103TI manufactured by Varian Associates, Palo Alto, Calif. This type tube has the added advantage that the travelling wave tube envelope may be removed from the exterior structure for easier joining of the two sections.

The cathode ray tube section is hermetically sealed to the travelling wave tube section. Once the electron beam is amplified using velocity modulation means in the travelling wave tube section, the role of the cathode ray tube section is generally passive, providing deflection plates 58 and 59, and a screen 60. The deflection plates 58 and 59 should be equal in size to provide a horizontal sweep equivalent in size to the vertical sweep.

Anode 57 accelerates an electron beam 53 into the cathode ray tube section 51 where beam 53 is deflected electrically by X and Y deflection plates 58 and 59. A sweep generator 62 is arranged and connected to provide X and Y deflection plates 58 and 59 with a sweep signal for deflecting beam 53 in a spiral of decreasing radius or other continuous sweep pattern.

Electron beam 53 produced by electron gun 52 is aimed along the axis of helix 55 due to an accelerating potential applied between electron gun 52 and anode 57. The helix 55, capable of propagating a slow wave in the microwave frequency range, is responsive to a microwave signal applied across the first end of helix 55 by means of input microwave coupling 54.

When an applied signal is impressed on helix 54, e.g., from bandpass filters 31 or 32, the signal is inductively coupled to helix 55. Electron beam 53 is velocity-modulated by the varying signal on the helix 55. Velocity modulation means that the electron beam is formed into bunches of electrons, the spacing of which is proportional to the impressed signal. The bunched electrons emerge from helix 55 and travel through hollow cylindrical anode 57, encountering X and Y deflectors 58 and 59. As the modulated beam is swept across the screen 60 of the cathode ray tube section 51, bright spots appear on the face of the tube, each spot separated from the next by an amount proportional to the signal wavelength. Sweep generator 62 is connected to vertical and horizontal plates 59 and 58 on which a voltage is swept with a 90° phase delay between plates. The highest sweep frequency desirable in practice is approximately equal to one tenth the signal frequency.

For example, if the signal frequency is 4 gHz. and the sweep frequency is 400 MHz., then twenty bright spots per sweep would appear on the tube face. The sweep generator can incorporate a frequency divider to lower the sweep frequency to allow more spots per sweep to appear. In practice, the sweep generator may be triggered to sweep the beam 53 across tube face 60 at a known sweep velocity whenever desired. The use of the sweep generator in this mode would allow easy calibration of the sweep generator frequency when compared with a known input signal. In general, a continuously writing sweep generator is desirable.

Once the signal display amplifiers 42 and 43 are calibrated, measurements may proceed. An explosive charge or other shock wave source is located near a surface of specimen 11 as above. A pin switch (not shown) is located parallel to the surface 13 to be shocked.

Since the shock wave velocity is known in any time interval, the position of the shock front will be known. If it is desirable to determine, for example, the velocity of surface 13 when the shock front has travelled half way through specimen 11, sweep generator 62 can be triggered at the equivalent appropriate time. A pin switch (not shown) is connected to sweep generator 62 by means of a length of coaxial cable whose total time delay is equal to the time for the shock front to pass from surface 13 where the pin switch is located to half way through specimen 11.

The signal display amplifier will then indicate the signal frequency by comparison of the number of spots appearing on the tube face 60 with previous calibrations. The steady state signal frequencies, i.e., region 75 in FIGURE 3a, $f_\alpha$ and $f_\beta$ appearing on two such signal display amplifiers 42 and 43, are used to deduce the instantaneous velocity of movement of the surface 13.

Specifically in this example, where there is a change in refractive index of a material, the compressive velocity of a shocked specimen plate surface designated $U_p$ is given by the formula:

$$U_p = U_s - \left[\frac{\left(\frac{\lambda_0 f_\alpha}{2} + U_s N_1 \cos_{\alpha 1}\right)^2 \left(\frac{\lambda_0 f_\beta}{2} + U_s N_1 \cos_{\beta 1}\right)^2}{N_1^2(\sin^2_{\beta 1} - \sin^2_{\alpha 1})}\right]^{1/2}$$

where $U_s$ is the shock wave velocity obtained, e.g., by the use of pin switches as explained above;

$\lambda_0$ is the wavelength of beam external to the specimen plate;

$N_1$ is the index of refraction of the unshocked plate material;

$f_\alpha$ is the interference frequency obtained from a first signal display amplifier;

$f_\beta$ is a similar measurement taken from a second signal display amplifier; and $\alpha_1$ and $\beta_1$ are the interior angles made by the dual beam components, 19b and 19a, respectively, with a transverse plane perpendicular to plate surface 12.

This formula and a second formula giving $N_2$, the refractive index in the shocked plate material, are derived in the report UCRL 14488 cited above.

Where there is no change in refractive index of the moving specimen plate, a single beam will yield phase shifts, the rate of which is indicative of the velocity, acceleration, etc., of the rapidly moving specimen, as in conventional interferometry as noted above.

It will be recognized that qualitative visual observations of the intermediate frequencies portrayed as indicated alone presents useful information as to the plate velocity. However, the precise and quantitative information is gained by correlating the intermediate frequency readings and the trajectory of the object to be measured. The readings then provide a time record of the trajectory.

Secondly, the modulation rate must be adjusted with relation to the bandpass frequency. If the modulation rate is equal to the bandwidth of the electro-optical devices, both overlap and gaps in the diagnostic signal observed at intermediate frequencies will be avoided. Increasing or decreasing the modulation rate with respect to the bandwidth mentioned above will cause overlaps and gaps in the bandwidth covered, as mentioned above.

Obviously, all of the electronic equipment should be designed to be compatible at the intermediate frequencies. In the heterodyne process, unwanted frequencies usually appear. For this reason, it is recommended that bandpass filters 30, 31 be used to increase the selectivity of the electronic equipment at the intermediate frequency range to eliminate unwanted harmonics, etc.

Having described the method and apparatus which comprise this invention in conjunction with a particular application, it is to be understood that the discussion of the application, uses and examples are illustrative only and that the invention can be employed for other purposes without departing from the true scope of the invention. Obviously, distances and accelerations, as well as velocities, can be ascertained from the interference frequencies obtained. In particular, the frequency of the beam components can be selected over a wide range of the electromagnetic spectrum and is not confined to the spectrum of visible light, but may be above and/or below such visible light in frequency. The principles herein disclosed are envisioned as suitable for use in microwave and X-ray interferometry. The modulation methods for microwaves

What is claimed is:
1. An interferometric method comprising:
   (a) generating at least one reference beam and a diagnostic beam of monochromatic electromagnetic radiation;
   (b) modulating said reference beam by interaction with oscillating radiofrequency energy to provide a modulated sideband reference beam of said monochromatic radiation;
   (c) splitting said reference beam and diagnostic beam into at least two diverging beams each;
   (d) directing said diagnostic beam of monochromatic radiation to converge along different paths in a transparent medium being displaced and to return therefrom providing an effective change in path lengths of said diagnostic beams and a concurrent change in phase with respect to said reference beams;
   (e) combining said modulated sideband reference beams with said diagnostic beams to travel along common beam paths;
   (f) directing said combined beams to impinge upon interference pattern sensors of a predetermined bandwidth in interferometric relation to produce therein signals having imposed thereon count rate interference frequency information, and of a frequency accepted by the bandpass bandwidth of said interference pattern sensors; and
   (g) determining the frequency variations of said signals as a measure of said count rate and of the rate of displacement of said medium.

2. A method as defined in claim 1, wherein said electromagnetic radiation is generated by means of a coherent light generator.

3. A method as defined in claim 2, wherein said signal accepted by the bandpass of said interference pattern sensor is passed through an amplifier to increase the strength of the signal, and the frequency thereof is then determined.

4. A method as defined in claim 3, wherein the signal residing in the bandpass frequency of said interference sensor is visually displayed to provide a measure of said count rate.

5. A method as defined in claim 4, wherein said sideband modulating frequency substantially corresponds to the bandpass frequency of said amplifying means so that successive increments of said interference count rate are visually displayed.

6. A method as defined in claim 4, wherein said sideband modulation is single sideband modulation.

7. A method as defined in claim 3, wherein said signal accepted by the bandpass frequency band of said sensor is passed through a travelling wave device to be amplified and the amplified signal is then displayed on a cathode ray tube display screen.

8. Apparatus for determining the velocity of displacement of a moving transparent medium providing a change in effective path length of a beam of radiation traversing said medium and returning therefrom comprising:
   (a) a light source for emitting a beam of light;
   (b) means for splitting said beam of light into a pair of reference and diagnostic beams;
   (c) means for splitting said beams of light into at least two each divergent reference and diagnostic portions, and for direction of said diagnostic portions to traverse said medium and be confluent therein and reflected therefrom with a change in path length and phase indicative of said velocity;
   (d) means disposed to interact with and modulate the reference portion of said beam;
   (e) sensor means having optical signal input means and electric signal output means, said input means disposed to intercept said reflected diagnostic and modulated reference beam portions in interference relation providing an input signal which acquires interference frequency information as to the rate of change of phase of said diagnostic beam with reference to said reference beam, wherein said output means is productive of an electrical voltage analogue to said input signal; and
   (f) means connected to said sensor means for determining the count rate interference frequency of interaction of said diagnostic and reference beams indicative of said velocity.

9. Apparatus as defined in claim 8, wherein said modulation means is an electro-optic crystal driven by a microwave resonant cavity.

10. Apparatus as defined in claim 8, wherein bandpass filters are connected between said sensor and said means for determining said interference frequency, said bandpass filters being transmissive in the frequency range characteristic of the common pass band frequencies of said sensor and of said signal display amplifier, thereby increasing the selectivity of said signal display amplifier.

11. Apparatus as defined in claim 8, wherein said coherent light source is a single frequency coherent light source.

12. Apparatus as defined in claim 8, wherein said means connected to said sensor means for determining the interference frequency of interaction of said diagnostic and reference beams comprises means for amplifying electrical signals from said sensor, and means for displaying the resultant amplified electrical signals.

References Cited

UNITED STATES PATENTS

| | | |
|---|---|---|
| 3,204,104 | 8/1965 | Baird et al. _____ 350—150 X |
| 3,256,443 | 6/1966 | Moore. |
| 3,302,027 | 1/1967 | Fried et al. |

JEWELL H. PEDERSEN, Primary Examiner

T. MAJOR, Assistant Examiner

U.S. Cl. X.R.

356—113